(12) United States Patent
Vaidyanathan et al.

(10) Patent No.: US 8,214,801 B2
(45) Date of Patent: Jul. 3, 2012

(54) APPLYING PERSISTENCE TO SELECTED ATTRIBUTES OF STATIC AND DYNAMIC OPERATING SYSTEM COMPONENTS

(75) Inventors: Basu Vaidyanathan, Austin, TX (US); Stephen Bailey Peckham, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1089 days.

(21) Appl. No.: 12/113,624

(22) Filed: May 1, 2008

(65) Prior Publication Data

US 2009/0276756 A1    Nov. 5, 2009

(51) Int. Cl.
*G06F 9/44* (2006.01)
(52) U.S. Cl. ............... 717/120; 717/121; 717/107
(58) Field of Classification Search ................ 717/120, 717/121, 107
See application file for complete search history.

(56) References Cited

U.S. PATENT DOCUMENTS

| | | | |
|---|---|---|---|
| 6,557,054 B2 | 4/2003 | Reisman | |
| 6,658,470 B1 | 12/2003 | deBardelaben | |
| 7,120,685 B2 | 10/2006 | Ullmann et al. | |
| 7,181,438 B1 | 2/2007 | Szabo | |
| 7,308,487 B1 | 12/2007 | Dansie et al. | |
| 8,005,847 B2 * | 8/2011 | Levy et al. | 707/755 |

OTHER PUBLICATIONS

Islam, N. "Customizing System Software Using OO Frameworks", 1997, IEEE, p. 69-78.*

* cited by examiner

*Primary Examiner* — Qamrun Nahar
(74) *Attorney, Agent, or Firm* — Yee & Associates, P.C.; David A. Mims, Jr.

(57) ABSTRACT

A process for managing customizations for components in a component tree includes for each customization associated with the parent of a component, matching the pathname of the component with the customization path. The process further includes associating the customization with the component, if the matching results in a partial match. The process further includes applying the customization to the component, if the matching results in a complete match.

15 Claims, 4 Drawing Sheets

Operating System architecture

APPLYING PERSISTENCE TO SELECTED ATTRIBUTES OF STATIC AND DYNAMIC OPERATING SYSTEM COMPONENTS

FIELD OF THE INVENTION

The present invention relates generally to components of the operating system and more specifically for managing customization of components in a component tree.

BACKGROUND OF THE INVENTION

In information technology environment Reliability, Availability and Serviceability (RAS) functionality of an Operating System (OS) is one of the major customer requirements. RAS capabilities have generally been deployed in the processor hardware, but having these features in the OS increases the value of RAS to customers.

Multiple components of the OS, such as device drivers, process management, and memory management, each have different RAS capabilities. Each RAS capability has different RAS attributes. The RAS attribute values are tuned to control the overall RAS capability of the OS. Reliability helps detect faults in components in a timely manner. Availability is the amount of time a device (or a component) actually operates as a percentage of the total time it should be operating. Serviceability takes the form of various methods of diagnosing errors in components.

Generally, First Fault Data Capture (FFDC) captures required information to diagnose a root cause in case of a system fault. In case FFDC fails to do so, the RAS attribute values associated with the system capabilities of the components can also be tuned to collect data at various strategic points in a run time environment of the OS and thus provide information to diagnose the root cause of the system fault. However, when applying RAS attribute values to the components, all existing customizations that specify applicable RAS attribute values are searched. Searching all existing customizations that specify applicable RAS attributes is inefficient and time consuming.

Therefore, a need exists for a more efficient way to search customizations specifying the applicable RAS attribute values when applying RAS attribute values to existing or new components.

BRIEF SUMMARY OF THE INVENTION

A computer implemented process to manage customizations for components in a component tree includes, for each customization associated with the parent of a component, matching the pathname of the component with the customization path. The process further includes associating the customization with the component, if the matching results in a partial match. The process further includes applying the customization to the component, if the matching results in a complete match.

A programmable apparatus for managing customizations for components in a component tree includes programmable hardware connected to a memory. The apparatus further includes a program stored in the memory where the program directs the programmable hardware to perform for each customization associated with the parent of a component, matching the pathname of the component with the customization path. The program further directs the programmable hardware to perform the step of associating the customization with the component, if the matching results in a partial match. The program further directs the programmable hardware to perform the step of applying the customization to the component, if the matching results in a complete match.

A computer program product for causing a computer to manage customizations for components in a component tree includes a computer readable storage medium. The computer program product further includes a program stored in the computer readable storage medium. The computer readable storage medium, so configured by the program, causes a computer to perform for each customization associated with the parent of a component, matching the pathname of the component with the customization path. The computer is further configured to perform the step of associating the customization with the component, if the matching results in a partial match. The computer is further configured to perform the step of applying the customization to the component, if the matching results in a complete match.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrated embodiment when read in conjunction with the accompanying drawings, wherein:

DETAILED DESCRIPTION

Figure 1:
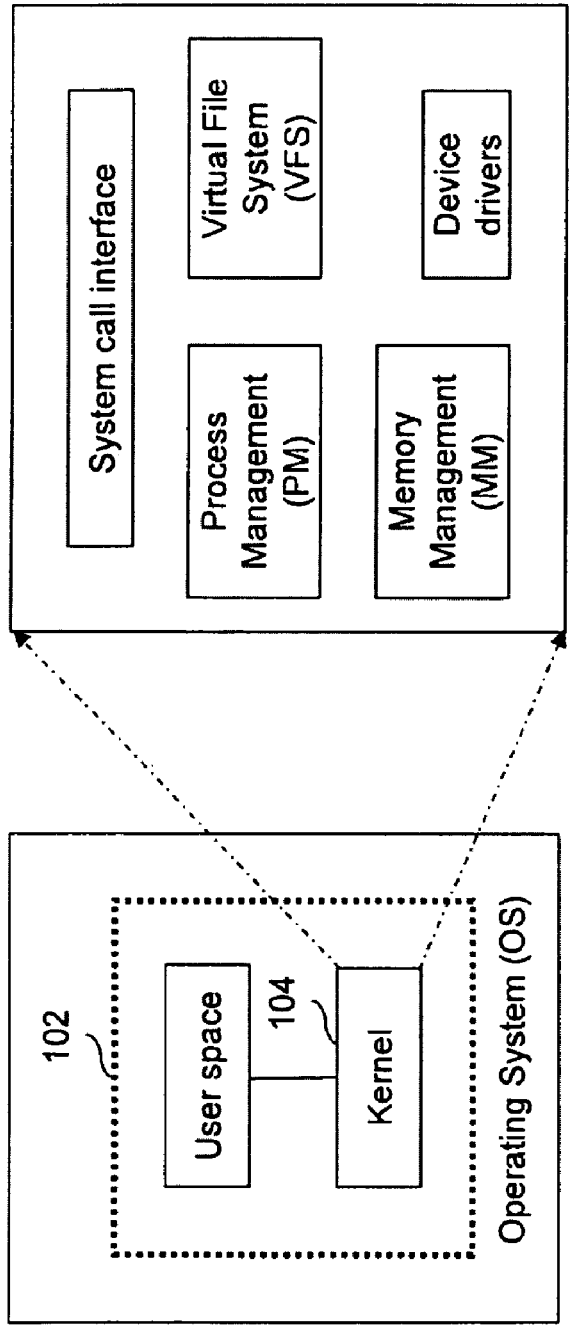
FIG. 1 illustrates an exemplary Operating System (OS) environment in accordance with an embodiment of the present invention.

FIG. 1 illustrates environment 100 of Operating System (OS) 102 in accordance with an embodiment of the present invention. Almost all computer systems like hand-held computers, desktop computers, supercomputers, and even modern video game consoles, use some type of OS 102. OS 102 is software platform that is housed on a hardware platform (having hardware components) of a computer system, where OS 102 is responsible for management and coordination of activities and sharing of different resources of the computer system. OS 102 provides a user space that acts as a host for multiple application programs that run on the computer system. As a host, another function of OS 102 is to handle operational management of hardware components. This function is performed by kernel 104 residing in OS 102. As a central component of OS 102, kernel 104 provides the lowest level of abstraction layer between the user space and the hardware platform for the resources (like memory, processors and I/O devices) that application software, running on the user space, controls to perform the desired function. Kernel 104 also handles memory allocation and processor allocation to different application software in the user space. Kernel 104 has various components that help in management of these resources. Some of the exemplary components of kernel 104 of a Linux™ based OS 102 are explained below.

System Call Interface (SCI)—The SCI is an interface between the user space and a service, like abstraction layers for the resources, that kernel 104 provides.

Process management (PM)—The PM allows the execution of applications on the user space and supports the applications with features such as hardware abstractions.

Memory management (MM)—The MM component of kernel 104 defines process to access the system's memory and allow applications running on the user space to safely access this memory.

Virtual file system (VFS)—The VFS of kernel 104 provides a common interface abstraction between the hardware platform and the user space for file systems. The VFS provides a switching layer between the SCI and the file systems supported by kernel 104.

Device drivers—The device drivers in kernel 104 contains majority of the source code that makes a particular hardware device usable.

These system components of Linux OS described above are applicable to AIX OS as well.

The above given OS 102 architecture and its components are purely for exemplary purpose and do not limit the scope of the invention. It will be apparent to the person skilled in the art, that the teachings of the present invention may be applied to any OS architecture.

FIG. 1 further depicts an embodiment of the present invention, where the components of kernel 104, some of which are explained above, may incorporate various capabilities such as error checking, OS component trace, OS component live dump, and error recovery. These capabilities are generally defined as Reliability Availability Serviceability (RAS) capabilities or RAS parameters. Reliability feature helps detecting and avoiding system faults in a timely manner. Reliability in the system ensures that the system does not continue delivering results with corrupted data; instead it either corrects the corrupted data, or stops and reports the corruption. Availability feature represents the amount of time a device in the system actually operates as a percentage of total time it should be operating. Availability may be counted in minutes or hours of downtime per year. Serviceability takes the form of various methods of easily diagnosing the system when faults occur. Early detection of faults can decrease or avoid system downtime thus increase system's availability and serviceability.

Each of these RAS capabilities of the components has some RAS attribute values that are applied to them. The RAS attributes values are tuned or modified to control the overall RAS capability of OS 102. Some of the exemplary RAS attribute values corresponding to "Component Trace" capability of the component "Memory Management" are shown below:

memtraceon—Turns on memory trace mode.
memtraceoff—Turns off memory trace mode.
memtraceresume—Resumes memory trace mode.
memtracesuspend—Suspends the memory trace mode.
memtracebufsize=sz—Changes the size of the private buffer allocated in memory trace mode.
memtraceminimal—Changes memory trace mode level to 1.
memtracenormal—Changes memory trace mode level to 3.
memtracedetail—Changes memory trace mode level to 7.
memtracemax—Changes the level of the memory trace mode to the maximum detail level 9.
memtracelevel=d—Changes the level of trace of the memory trace mode. Sets it to the specified level.
memtracefilltime—Displays the data retention time (i.e., the estimated time to fill the private memory buffer). This is available only if the memory trace mode is on.

The attribute values can be tuned to capture data at various strategic points, which can help in detecting system faults. There are different commands that can be used to modify, tune or display the attributes values of components. As an example "ctctrl" command (in UNIX based OS 102) can be used to modify or display attributes values of the 'Component Trace' capability. It will be apparent to a person skilled in the art that above command is purely for exemplary purposes and does not limit the scope of the invention. The attributes values can also be set to be persistent across OS 102 reboots. In an exemplary embodiment of the present invention, in an UNIX based OS 102, a "bosboot" command is used to make the attribute values persistent across OS 102 reboots.

In an embodiment of the present invention, the components are created in a dynamically maintained hierarchical data structure such as tree. The names of the component in the component tree are specified in a manner similar to files names in the directory of the computer system.

Figure 2:
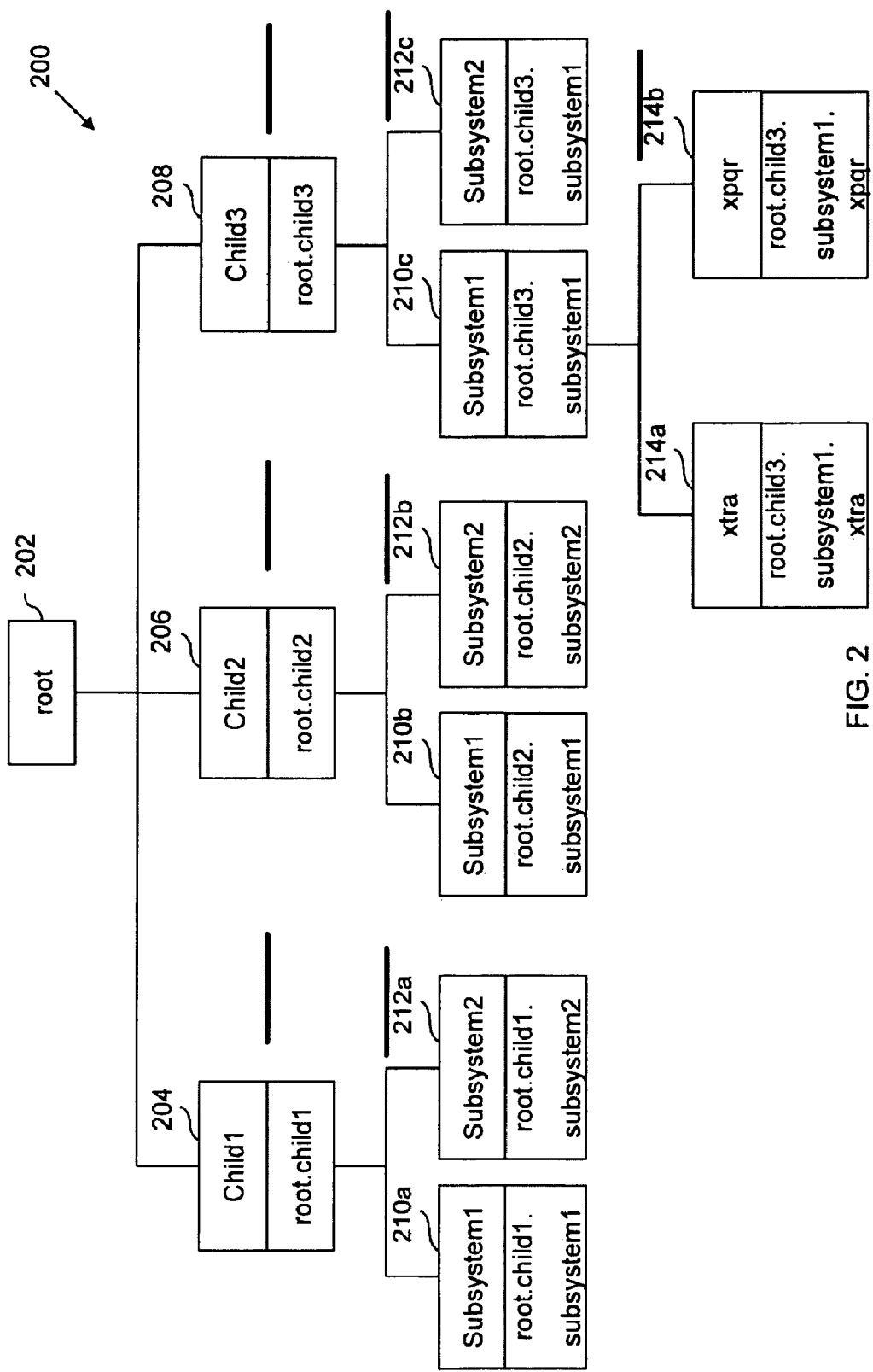
FIG. 2 illustrates a hierarchical data structure of components of the OS in accordance with an embodiment of the present invention.

FIG. 2 illustrates a hierarchical data structure of components of OS 102 in accordance with an embodiment of the present invention. In an embodiment of the present invention, the hierarchical data structure represents component tree 200. In component tree 200, each component is represented as a node in component tree 200 with the component name and the component's complete pathname. Hence, a prefix in the pathname of the component represents parent of that component. As shown in the FIG. 2, when a component 'root' is created, node 202 represents 'root' in component tree 200. Similarly, nodes 204, 206, and 208 represent child components 'child1', 'child2', and 'child3' in component tree 200, respectively. Each of these child components have 'root' as their parent. It will be apparent to a person skilled in the art that component 'root' may have other child components also (as represented by dotted lines in FIG. 2). The pathname of component 'child1' at node 204 in component tree 200 is represented as 'root.child1'. Similarly, the pathname corresponding to components 'child2' (at node 206) and 'child3' (at node 208) are 'root.child2' and 'root.child3', respectively.

FIG. 2 further depicts an embodiment of the present invention, where each of the child components 'child1', 'child2' and 'child3' are the parent of their further child components. As shown in the FIG. 2 component 'child1' is the parent of components 'subsystem1' represented at node 210a and 'subsystem2' represented at node 212a. Similarly, component 'child2' and component 'child3' are parents of components 'subsystem1' represented at node 210b, 'subsystem2' represented at node 212b, and 'subsystem1' represented at node 210c, 'subsystem2' represented at node 212c, respectively. Again, each of 'child 1', 'child 2' and 'child 3' may have other child components (as represented by dotted lines). As an exemplary case, pathnames of component 'subsystem1' represented at node 210a and component 'subsystem2' represented at node 212b are shown in the FIG. 2 as 'root.child1.subsystem1' and 'root.child2.subsystem2'. Further, the component 'subsystem1' has further of child components 'xtra' represented at node 214a and 'xpqr' represented at node 214b. Accordingly, the pathnames corresponding to component 'xtra' and 'xpqr' are 'root.child3.subsystem1.xtra' and 'root.child3.subsystem1.xpqr', respectively.

In an exemplary embodiment of the present invention each of the components of component tree 200 may have different RAS capabilities such as error checking or component trace. In order to control the RAS capabilities of the components, RAS attribute values are applied to these components. For applying the attributes values to the components, kernel 104 needs to search all existing customizations to identify the customizations that are applicable for a particular component. Generally, each customization has a specified pathname called customization path and a specified attribute value pair corresponding to the customization path. Customization path is a pathname associated with the customization that may use wildcards to define a set of components to which the customization must be applied. For example, a customization path "a.b.c.x*" defines that the customization must be applied to all child components of node 'c' (having pathname "a.b.c") whose name begins with an 'x'. The attribute value pair signifies values defined corresponding to the attributes of the component.

In various embodiments of the present invention, for an efficient searching method, each time when a component is created, customizations that are applicable to the component are applied to the component, while the customizations that are applicable to the component's children are associated with the component. Thus, when another component is created, kernel 104 checks only the customizations associated with the parent of the component, instead of checking all existing customizations thus making the searching process efficient.

Figure 3:
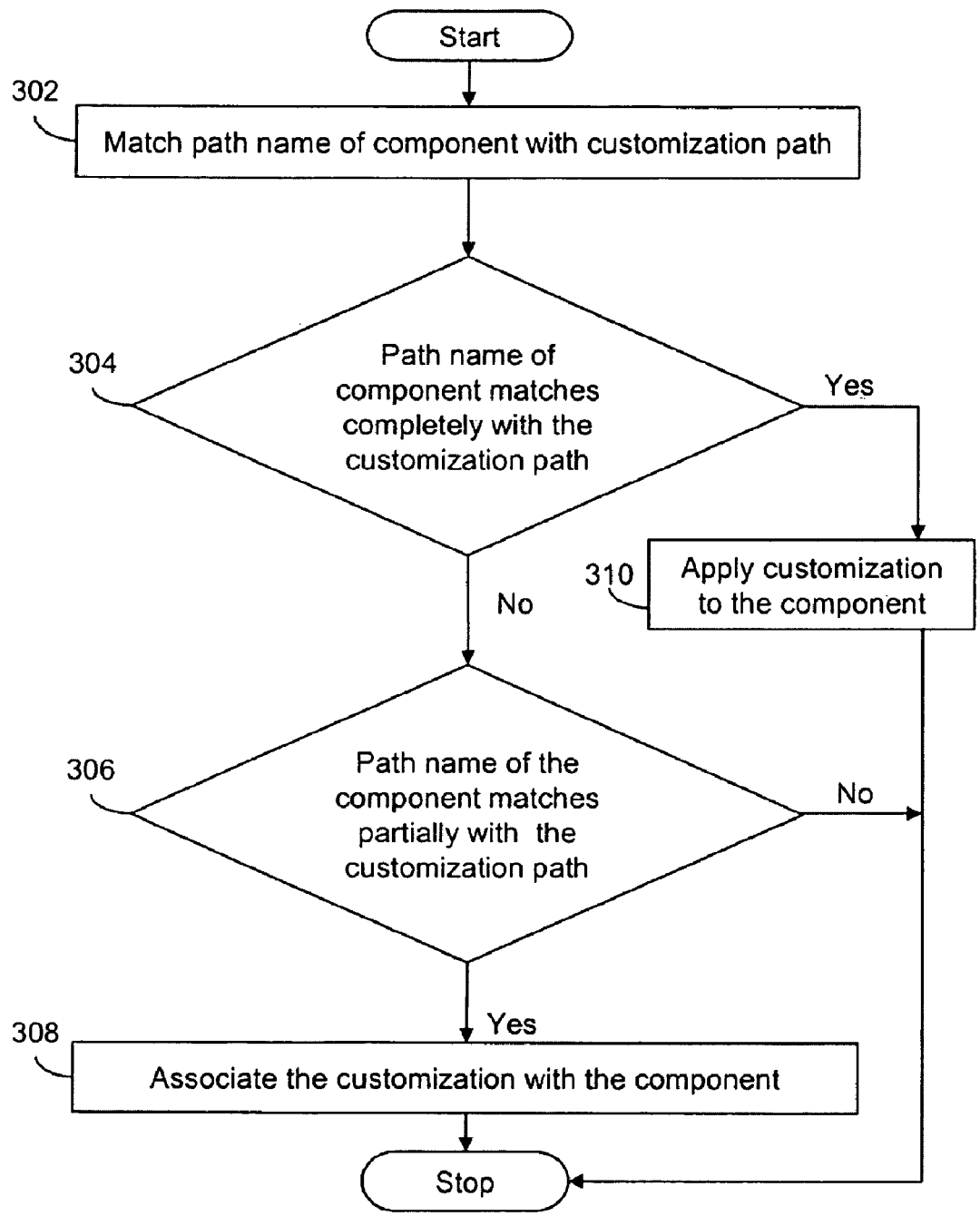
FIG. 3 illustrates a flowchart depicting a process of managing customizations for components in a component tree in accordance with an embodiment of the present invention.

FIG. 3 illustrates a flowchart depicting a process of managing customizations for components in component tree 200 in accordance with an embodiment of the present invention. When a component is created, the parent of the created component already has some associated customizations. In an embodiment of the present invention, references to all such customizations are stored at a node representing the parent component in component tree 200. Now, when a component is created and if the parent of the created component already has associated customizations, the process described in conjunction with the FIG. 3 (steps 302 to 310) is executed for each customization associated with the parent. Then at step (302), the pathname of the component is matched with the customization path specified in the customization associated with the parent. Thereafter, at step (304), kernel 104 checks if the pathname of the component matches completely with the customization path specified in the customization. In an embodiment of the present invention, if the pathname of the component does not match completely, then at step (306), kernel 104 checks if the pathname of the component matches partially with the customization path. Partial matching implies that the pathname of the component matches a prefix in the customization path. If the pathname of the component matches partially with the customization path specified in the customization of the parent, then at step (308), kernel 104 associates the customization with the component. The customizations associated with the component will need to be applied to at least some children of the component as and when they will get created. Since, references to these customizations are stored at the node corresponding to the component in component tree 200, children of the component can access these customizations whenever they are created. In an embodiment of the present invention, the customizations associated with the component, can be set as persistent customization. In such a case the customizations associated with the component remain unchanged across OS 102 reboots.

In an exemplary embodiment of the present invention, a component 'root' represented at node 202 (as shown in conjunction with the FIG. 2) is created in component tree 200. Now, a customization needs to be applied to components whose pathname matches with a customization path 'root.child3.subsystem1.x*'. Since 'root' is parent for all components in component tree 200, this customization is associated with the component 'root'. Also, node 202 stores a reference to this customization. Later, when component 'child3' represented at node 208 is created, the pathname of the component 'child3' i.e. 'root.child3' is matched with the customization path specified in the customization associated with the parent 'root'. Since pathname of component 'child3' matches with the prefix of the customization path (i.e. 'root.child3.subsystem1.x*'), this customization is also associated with the component 'child3'. Similarly the customization is also associated with 'subsystem1' represented at node 210c. Also, the reference to this customization is stored at the node 208 and node 210c corresponding to components 'child3'' and 'subsystem1', respectively.

FIG. 3 further depicts an embodiment of the present invention when at step (304) and step (306) the pathname of the component does not match completely or partially with any of the customization path specified in the customization associated with the parent of the component. In such a case, no customization is associated with the component. For example, when component 'child1' represented at node 204, is created in component tree 200, the pathname of the component 'child1' (root.child1) is matched with the customization path (root.child3.subsystem1.x*). Since the pathname of the component 'child1' does not match partially or completely with the customization path, this customization is not associated with the component 'child1'. Similarly, this customization is not associated with components 'child2' represented at node 206 and 'subsystem2' represented at node 212c.

FIG. 3 further depicts yet another embodiment of the present invention, when a component created in component tree 200 does not have customizations associated with the parent of the component. In such a case, none of the process steps of the FIG. 3 are executed. For example, when component 'subsystem1' represented at node 210a and 'subsystem2' represented at node 212a is created, and since the parent 'child1' of the components 'subsystem1' and 'subsystem2' do not have any customization associated with 'child1', none of the process steps of the FIG. 3 are executed. Similarly, when components 'subsystem1' represented at node 210b, and 'subsystem2' represented at node 212b are created having 'child2' as their parent, none of the process steps of the FIG. 3 are executed.

FIG. 3 further depicts an embodiment of the present invention, when at step (304), the pathname of the component matches completely with the customization path specified in the customizations associated with the parent of the component. Subsequently, at step (310), the customization is applied to the component, whose pathname matches completely with customization path. Thus the attribute values specified in the customization are applied to the component. In an embodiment of the present invention, if the customization path has wildcard character, then all those components that have pathname matching the customization path will have the same attribute values. For example when component 'xtra' represented at node 214a is created, the pathname of the component 'xtra' (i.e. 'root.child3.subsystem1.xtra') completely matches with the customization path, i.e. 'root.child3.subsystem1.x*'. Subsequently, the customization and thus the attribute values are applied on the component 'xtra'. Since the customization path 'root.child3.subsystem1.x*' has the wildcard character '*' on the component 'x*', even component 'xpqr' represented at node 214b will have the same customization and thus the attribute values as of component 'xtra'.

Figure 4:
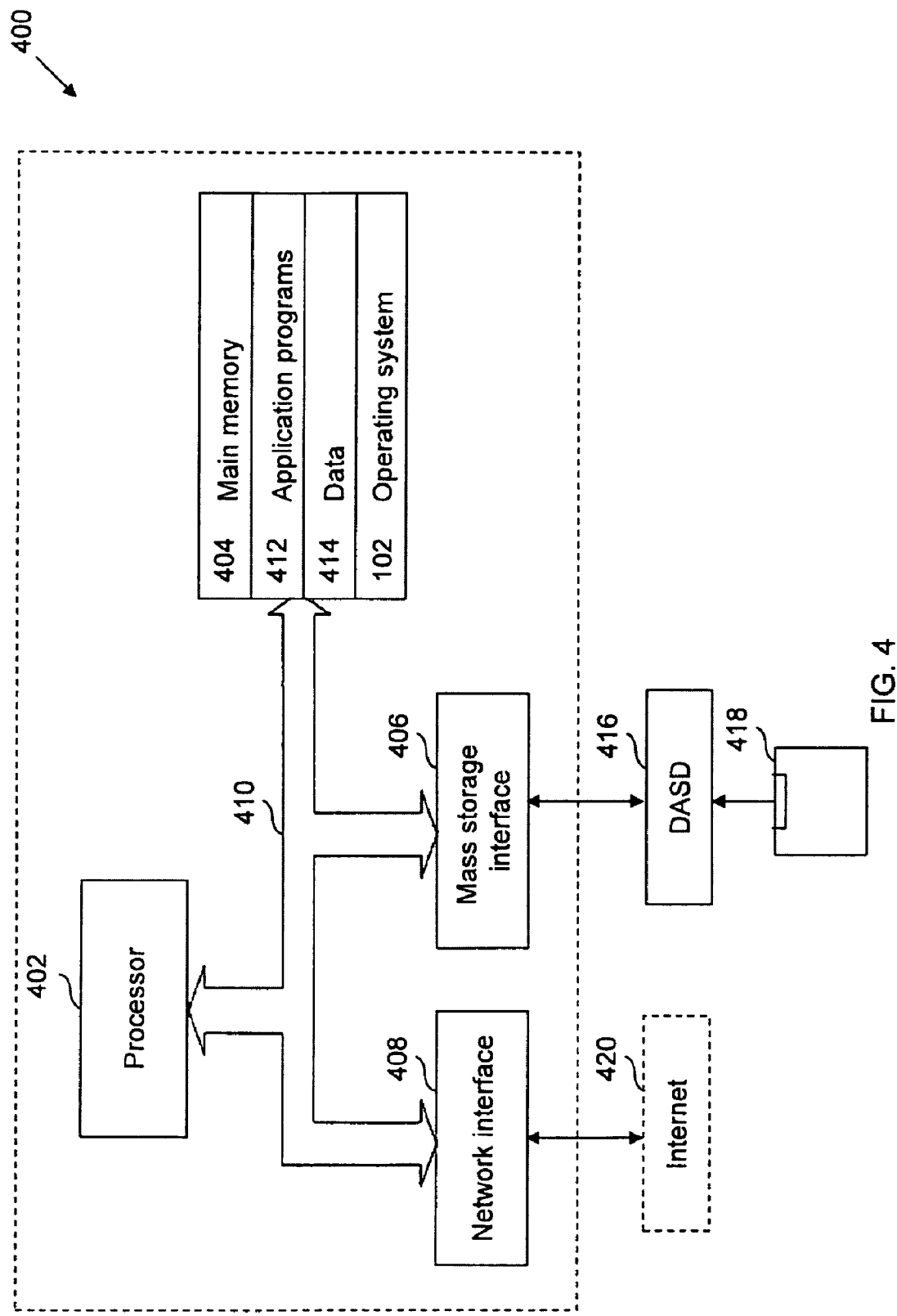
FIG. 4 is a block diagram of an apparatus for managing customizations of components in a component tree in accordance with an embodiment of the present invention.

FIG. 4 is a block diagram of an apparatus for managing customizations of components in component tree 200. Apparatus depicted in the FIG. 4 is computer system 400 that includes processor 402, main memory 404, mass storage interface 406, and network interface 408, all connected by system bus 410. Those skilled in the art will appreciate that this system encompasses all types of computer systems: personal computers, midrange computers, mainframes, etc. Note that many additions, modifications, and deletions can be made to this computer system 400 within the scope of the invention. Examples of possible additions include: a display, a keyboard, a cache memory, and peripheral devices such as printers.

FIG. 4 further depicts processor 402 that can be constructed from one or more microprocessors and/or integrated circuits. Processor 402 executes program instructions stored in main memory 404. Main memory 404 stores programs and data that computer system 400 may access.

In an embodiment of the present invention, main memory 404 stores program instructions that perform one or more process steps as explained in conjunction with the FIG. 3. Further, a programmable hardware executes these program instructions. The programmable hardware may include, without limitation hardware that executes software based program instructions such as processor 402. The programmable hardware may also include hardware where program instructions are embodied in the hardware itself such as Field Programmable Gate Array (FPGA), Application Specific Integrated Circuit (ASIC) or any combination thereof.

FIG. 4 further depicts main memory 404 that includes one or more application programs 412, data 414, and OS 102. When computer system 400 starts, processor 402 initially executes the program instructions that make up OS 102. OS 102 is a sophisticated program that manages the resources of computer system 400 for example, processor 402, main memory 404, mass storage interface 406, network interface 408, and system bus 410.

In an embodiment of the present invention, processor 402 under the control of OS 102 executes application programs 412. Application programs 412 can be run with program data 414 as input. Application programs 412 can also output their results as program data 414 in main memory 404.

FIG. 4 further depicts mass storage interface 406 that allows computer system 400 to retrieve and store data from auxiliary storage devices such as magnetic disks (hard disks, diskettes) and optical disks (CD-ROM). These mass storage devices are commonly known as Direct Access Storage Devices (DASD) 416, and act as a permanent store of information. One suitable type of DASD 416 is floppy disk drive that reads data from and writes data to floppy diskette 418. The information from DASD 416 can be in many forms. Common forms are application programs and program data. Data retrieved through mass storage interface 406 is usually placed in main memory 404 where processor 402 can process it.

While main memory 404 and DASD 416 are typically separate storage devices, computer system 400 uses well known virtual addressing mechanisms that allow the programs of computer system 400 to run smoothly as if having access to a large, single storage entity, instead of access to multiple, smaller storage entities (e.g., main memory 404 and DASD 416). Therefore, while certain elements are shown to reside in main memory 404, those skilled in the art will recognize that these are not necessarily all completely contained in main memory 404 at the same time. It should be noted that the term "memory" is used herein to generically refer to the entire virtual memory of computer system 400. In addition, an apparatus in accordance with the present invention includes any possible configuration of hardware and software that contains the elements of the invention, whether the apparatus is a single computer system or is comprised of multiple computer systems operating in concert.

FIG. 4 further depicts network interface 408 that allows computer system 400 to send and receive data to and from any network connected to computer system 400. This network may be a local area network (LAN), a wide area network (WAN), or more specifically Internet 420. Suitable methods of connecting to a network include known analog and/or digital techniques, as well as networking mechanisms that are developed in the future. Many different network protocols can be used to implement a network. These protocols are specialized computer programs that allow computers to communicate across a network. TCP/IP (Transmission Control Protocol/Internet Protocol), used to communicate across the Internet, is an example of a suitable network protocol.

FIG. 4 further depicts system bus 410 that allows data to be transferred among the various components of computer system 400. Although computer system 400 is shown to contain only a single main processor and a single system bus, those skilled in the art will appreciate that the present invention may be practiced using a computer system that has multiple processors and/or multiple buses. In addition, the interfaces that are used in the preferred embodiment of the present invention of the present invention may include separate, fully programmed microprocessors that are used to off-load compute-intensive processing from processor 402, or may include I/O adapters to perform similar functions.

In an embodiment of the present invention, the process of associating customizations with the component and storing a reference of all those customizations at the component node in a component tree, avoids searching of all the existing customizations when a new component is created. Thus, when a new component is created, only the customizations associated with the parent of the component can be searched and the attribute values specified in the customization are applied in case of a complete match with the customization path specified in the customization. Also, kernel can tune the applied attribute values to control the RAS capabilities of the components.

The present invention may take the form of an entirely hardware embodiment, an entirely software embodiment or an embodiment containing both hardware and software elements. In accordance with an embodiment of the present invention, the invention is implemented in software, which includes, but is not limited to firmware, resident software, microcode, etc.

Furthermore, the invention may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus or device.

The afore-mentioned medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CDROM), compact disk-read/write (CD-R/W) and DVD.

In the aforesaid description, specific embodiments of the present invention have been described by way of examples with reference to the accompanying figures and drawings. One of ordinary skill in the art will appreciate that various modifications and changes can be made to the embodiments without departing from the scope of the present invention as set forth in the claims below. Accordingly, the specification and figures are to be regarded in an illustrative rather than a restrictive sense, and all such modifications are intended to be included within the scope of present invention.

What is claimed is:

1. A computer implemented process to manage customizations for components of an operating system in a component tree comprising:
   a computer, for each customization associated with a parent of a component of the operating system in the component tree, performing actions comprising:
   comparing a pathname of the component with a customization path;
   responsive to determining that there is a partial match between the pathname of the component and the customization path, associating a customization with the component, wherein the customization includes at least one attribute value pair tuned to capture data for detecting system faults; and
   responsive to determining that there is a complete match between the pathname of the component and the customization path, applying the customization to the component, wherein the customization includes the at least one attribute value pair tuned to capture data for detecting system faults.

2. The computer implemented process of claim 1, wherein the process is executed when the component is created.

3. The computer implemented process of claim 1, wherein the customization comprises:
   the customization path; and
   attribute values of the component corresponding to the customization path.

4. The computer implemented process of claim 1, wherein the customization path comprises wildcard characters.

5. The computer implemented process of claim 1, wherein associating the customization with the component comprises storing a reference to the customization in a node corresponding to the component in the component tree.

6. The computer implemented process of claim 1, wherein applying the customization with the component comprises applying attribute values of the customization to the component.

7. The computer implemented process of claim 1 further comprising setting the customization persistent across operating system reboots.

8. A programmable apparatus for managing customizations for components of an operating system in a component tree, comprising: a processor;
   a programmable hardware connected to a memory wherein the programmable hardware includes the processor;
   a program stored in the memory;
   wherein the program directs the programmable hardware, for each customization associated with a parent of a component of the operating system in the component tree, to perform actions comprising:
   comparing a pathname of the component with a customization path;
   responsive to determining that there is a partial match between the pathname of the component and the customization path, associating a customization with the component, wherein the customization includes at least one attribute value pair tuned to capture data for detecting system faults; and
   responsive to determining that there is a complete match between the pathname of the component and the customization path, applying the customization to the component, wherein the customization includes the at least one attribute value pair tuned to capture data for detecting system faults.

9. A computer program product for causing a computer to manage customizations for components of an operating system in a component tree, comprising:
   a tangible computer readable storage device;
   program instructions stored on the computer readable storage device, for each customization associated with a parent of a component, for:
   comparing a pathname of the component with a customization path;
   responsive to determining that there is a partial match between the pathname of the component and the customization path, associating a customization with the component, wherein the customization includes at least one attribute value pair tuned to capture data for detecting system faults; and
   responsive to determining that there is a complete match between the pathname of the component and the customization path, applying the customization to the component, wherein the customization includes the at least one attribute value pair tuned to capture data for detecting system faults.

10. The computer program product of claim 9, wherein the computer executes the program when the component is created.

11. The computer program product of claim 9, wherein the customization comprises:
    the customization path; and
    attribute values of the component corresponding to the customization path.

12. The computer program product of claim 9, wherein the customization path comprises wildcard characters.

13. The computer program product of claim 9, wherein associating the customization with the component comprises storing a reference to the customization in a node corresponding to the component in the component tree.

14. The computer program product of claim 9, wherein applying the customization with the component comprises applying attribute values of the customization to the component.

15. The computer program product of claim 9 further causes a computer to perform setting the customization persistent across operating system reboots.

* * * * *